(12) United States Patent
Asaka et al.

(10) Patent No.: US 12,072,653 B2
(45) Date of Patent: Aug. 27, 2024

(54) ELECTROPHOTOGRAPHIC BELT, ELECTROPHOTOGRAPHIC IMAGE FORMING APPARATUS, METHOD OF PRODUCING ELECTROPHOTOGRAPHIC BELT, AND VARNISH

(71) Applicant: CANON KABUSHIKI KAISHA, Tokyo (JP)

(72) Inventors: Akeshi Asaka, Chiba (JP); Yuma Kobayashi, Kanagawa (JP); Taiki Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 17/828,301

(22) Filed: May 31, 2022

(65) Prior Publication Data

US 2022/0404750 A1 Dec. 22, 2022

(30) Foreign Application Priority Data

Jun. 15, 2021 (JP) .................................. 2021-099786
May 17, 2022 (JP) .................................. 2022-081087

(51) Int. Cl.
*G03G 15/20* (2006.01)
*B32B 27/28* (2006.01)
(Continued)

(52) U.S. Cl.
CPC ....... *G03G 15/2057* (2013.01); *B32B 27/281* (2013.01); *C08L 79/08* (2013.01);
(Continued)

(58) Field of Classification Search
CPC .............. G03G 15/2057; B32B 27/281; B32B 2307/302; B32B 2433/00; C09D 5/24;
(Continued)

(56) References Cited

U.S. PATENT DOCUMENTS 8,263,199 B2 9/2012 Nakajima et al.
9,250,585 B2 2/2016 Nakajima et al.
(Continued)

FOREIGN PATENT DOCUMENTS

| CN | 112210120 A | 1/2021 |
| EP | 2 088 122 A1 | 8/2009 |

(Continued)

OTHER PUBLICATIONS

Hideki Yamamoto, "Application of Hansen Solubility Parameter to Polymeric Hydrocarbons and Practical Use of Hansen Solubility Sphere Method," Proceedings of the Coal Science Conference, 55, pp. 86-89 (2018).

(Continued)

*Primary Examiner* — John D Freeman
(74) *Attorney, Agent, or Firm* — Venable LLP

(57) ABSTRACT

Provided is an electrophotographic belt having an endless shape including a base layer, wherein the base layer includes a polyimide film containing polyimide serving as a binder resin and a carbon nanotube, wherein the polyimide has an imidization ratio of 80% or more, wherein the carbon nanotube has at least one resin selected from the group consisting of: polyphenylsulfone; polysulfone; and polyethersulfone present on at least part of a surface thereof. The base layer has a tensile strength of 200 MPa or more in each of a peripheral direction thereof and a direction perpendicular to the peripheral direction.

6 Claims, 8 Drawing Sheets

(51) Int. Cl.
    *C08L 79/08*    (2006.01)
    *C09D 5/24*    (2006.01)
    *C09D 7/62*    (2018.01)
    *C09D 179/08*    (2006.01)

(52) U.S. Cl.
    CPC ............... *C09D 5/24* (2013.01); *C09D 7/62* (2018.01); *C09D 179/08* (2013.01); *B32B 2307/302* (2013.01); *B32B 2433/00* (2013.01)

(58) Field of Classification Search
    CPC .......... C09D 7/62; C09D 179/08; C09D 7/61; C09D 7/70; C08K 9/08; C08K 3/041; B82Y 40/00; B82Y 30/00; C01P 2002/82; B29D 29/00; C01B 32/174; C08L 79/08; C08L 81/06
    See application file for complete search history.

(56) References Cited

U.S. PATENT DOCUMENTS

| | | | |
|---|---|---|---|
| 9,335,690 | B2 | 5/2016 | Asaka et al. |
| 9,348,282 | B2 | 5/2016 | Tamura et al. |
| 9,348,283 | B2 | 5/2016 | Takada et al. |
| 9,367,009 | B2 | 6/2016 | Akiyama et al. |
| 2008/0292530 | A1 | 11/2008 | Keller et al. |
| 2010/0218979 | A1 | 9/2010 | Chang et al. |
| 2011/0052841 | A1* | 3/2011 | Wu ................... B82Y 30/00 428/32.5 |
| 2011/0127472 | A1* | 6/2011 | Sato .................. C01B 32/162 252/502 |
| 2014/0105659 | A1* | 4/2014 | Miyahara .......... G03G 15/2053 399/333 |

FOREIGN PATENT DOCUMENTS

| | | |
|---|---|---|
| EP | 2 444 459 A1 | 4/2012 |
| JP | 8-80580 A | 3/1996 |
| JP | 2003-255640 A | 9/2003 |
| JP | 2004-123867 A | 4/2004 |
| JP | 2005-215028 A | 8/2005 |
| JP | 2006-124613 A | 5/2006 |
| JP | 2009-156965 A | 7/2009 |
| JP | 2009-256617 A | 11/2009 |
| JP | 2016-012159 A | 1/2016 |
| JP | 2019-178027 A | 10/2019 |
| JP | 6775859 B1 | 10/2020 |
| KR | 2010-0131781 A | 12/2010 |
| KR | 101091866 B1 | 12/2011 |
| WO | 2008/044643 A1 | 4/2008 |
| WO | 2013/191440 A1 | 12/2013 |

OTHER PUBLICATIONS

Mio Kumai, "The New Technology for Material Evaluation with Pulse NMR," 55(2) J Im. Soc. Jpn 160-165 (2016).
Setsuo Ooi et al., "Fundamentals and Applications of Soil Colloid Science (17)," 68(4) J. Agr. Eng. Soc., Jpn 351-361 (Apr. 2000).
Extended European Search Report in European Application No. 22177466.4 (Nov. 2022).
U.S. Appl. No. 17/836,325, filed Jun. 9, 2022, Asaka et al.

\* cited by examiner

ELECTROPHOTOGRAPHIC BELT, ELECTROPHOTOGRAPHIC IMAGE FORMING APPARATUS, METHOD OF PRODUCING ELECTROPHOTOGRAPHIC BELT, AND VARNISH

BACKGROUND

Technical Field

The present disclosure relates to an electrophotographic belt, an electrophotographic image forming apparatus, a method of producing an electrophotographic belt, and a varnish.

Description of the Related Art

An electrophotographic belt receives a load, such as heating, pressurization, or bending, when used in an electrophotographic image forming apparatus.

For example, an electrophotographic belt serving as a fixing belt forms a fixing nip portion together with a pressurizing member arranged to face the fixing belt in, for example, a fixing device of a belt (film) heating system. In addition, in the fixing nip portion, the fixing belt transfers heat accumulated on the fixing belt to toner on a recording material. The heated toner melts to be fixed to the recording material. That is, the fixing belt serves to fix unfixed toner to the recording material.

A more specific configuration example is described. A fixing belt having an endless shape has arranged therein a ceramic heater serving as a heating element or a pressurizing pad serving as a pressure contact member. A rotatable pressurizing roller or a rotatable pressurizing belt is arranged at a position facing the fixing belt. The fixing belt is energized toward the pressurizing roller or the pressurizing belt by the ceramic heater or the pressurizing pad therein to form a fixing nip portion. A recording material having carried thereon an unfixed toner image is introduced into the fixing nip portion, and is conveyed along with the rotation of the fixing belt. In the process, heat from the fixing belt is applied to unfixed toner and the recording material, and the molten toner is press-bonded onto the recording material by a pressure applied to the unfixed toner in the fixing nip portion. Thus, a fixed toner image is formed. As described above, a high pressure and a high temperature are repeatedly applied to the fixing belt in the fixing nip portion.

Accordingly, the base layer of an electrophotographic belt to be used as a fixing belt is required to have sufficient heat resistance and high mechanical strength. Such strength that no crack occurs even when the belt is repeatedly bent is included as an example of the high mechanical strength. In view of the foregoing, in the base layer of the electrophotographic belt, polyimide may be preferably used as a resin having excellent mechanical strength.

Meanwhile, the thermal conductivity of the polyimide is lower than those of metals and ceramics by several orders of magnitude. Accordingly, an improvement in thermal conductivity of the base layer of the fixing belt has been required to satisfy requirements, such as: a reduction in power consumption required for an increase in print speed and heat supply to a heater (energy savings); and the downsizing of a fixing device.

A film formed of polyimide having imparted thereto new functions, such as electroconductivity and thermal conductivity, has been recently attracting attention.

In Japanese Patent Application Laid-Open No. H08-80580, there is a disclosure of a method including incorporating an inorganic filler excellent in thermal conductivity for achieving, for example, a reduction in power consumption, an increase in fixing speed, and a reduction in fixing temperature through an improvement in thermal conductivity of a fixing belt using a polyimide film as its base layer.

When an improvement in thermal conductivity of the fixing belt is achieved by filling highly thermally conductive particles (filler) into polyimide, an improvement in thermal conductivity reflecting the high thermal conductivity of the filler is difficult to achieve merely by uniformly dispersing the filler. In addition, high-density filling of the filler causes a remarkable reduction of excellent mechanical strength inherent in the polyimide. Accordingly, the impartment of high thermal conductivity to the belt by a small addition amount of the filler is required.

The use of carbon nanotubes (hereinafter also referred to as "CNTs") particularly excellent in electrical or thermal characteristics as a filler for imparting a new function to the polyimide film has been investigated, and hence the development of a polyimide film blended with the CNTs has been vigorously performed.

In Japanese Patent Application Laid-Open No. 2004-123867, there is a disclosure of a CNT-containing polyimide film having a high thermal conductivity, which is suitable for a fixing belt.

However, CNTs are each fibrous carbon. Accordingly, the CNTs are liable to be aggregated by a van der Waals force, and hence tend to form an aggregate in the polyimide film to be localized. Accordingly, in the polyimide film containing the CNTs that have formed the aggregate, high mechanical strength inherent in its polyimide may be remarkably impaired. As described in, for example, each of Examples of Japanese Patent Application Laid-Open No. 2006-124613, when the blending ratio of CNTs is increased for improving the thermal conductivity of a polyimide film, the mechanical strength of the polyimide film remarkably reduces.

In view of the foregoing, to suppress the production of an aggregate by CNTs in a polyimide film, a method of preparing a solution in which the CNTs are mixed with and dispersed in a surfactant or a specific polymer has been investigated.

In Japanese Patent Application Laid-Open No. 2006-124613, there is a disclosure that CNTs are dispersed in an amide-based polar organic solvent containing a nonionic surfactant and/or polyvinylpyrrolidone (PVP). There is a description that a polyimide film having uniformly dispersed therein the CNTs was obtained by: mixing the dispersion liquid thus obtained and a polyimide precursor; and curing the mixture at a temperature of 350° C. for 60 minutes to perform a dehydration imidization reaction.

According to an investigation made by the inventors, the polyimide film described in Japanese Patent Application Laid-Open No. 2006-124613 has still been susceptible to improvement in terms of both of mechanical strength and thermal conductivity in its thickness direction when used as the base layer of an electrophotographic belt.

SUMMARY

At least one aspect of the present disclosure is directed to providing an electrophotographic belt having high mechanical strength and having predetermined thermal conductivity in its thickness direction.

In addition, at least one aspect of the present disclosure is directed to providing a method of producing an electrophotographic belt having high mechanical strength and having predetermined thermal conductivity in its thickness direction.

In addition, at least one aspect of the present disclosure is directed to providing a varnish that can provide a polyimide film having a predetermined thermal conductivity in a thickness direction thereof and having an excellent mechanical strength.

Further, at least one aspect of the present disclosure is directed to providing a varnish that can provide a polyimide film excellent in mechanical strength and having predetermined thermal conductivity in its thickness direction.

According to one aspect of the present disclosure, there is provided an electrophotographic belt having an endless shape including a base layer, wherein the base layer includes a polyimide film containing polyimide serving as a binder resin and carbon nanotubes, wherein the polyimide has an imidization ratio of 80% or more, wherein the carbon nanotubes each have at least one resin selected from the group consisting of: polyphenylsulfone; polysulfone; and polyethersulfone present on at least part of a surface thereof, wherein the base layer has a tensile strength of 200 MPa or more in each of a peripheral direction thereof and a direction perpendicular to the peripheral direction.

According to another aspect of the present disclosure, there is provided a method of producing an electrophotographic belt having an endless shape comprising a base layer in which the base layer includes a polyimide film containing polyimide serving as a binder resin and a carbon nanotubes, the method including: (i) causing at least one resin selected from the group consisting of: polyphenylsulfone; polysulfone; and polyethersulfone to adhere to at least part of a surface of the carbon nanotube; (ii) dispersing the carbon nanotube having the resin caused to adhere to at least part of the surface thereof, which have been obtained in the step (i), in a solution containing a polyimide precursor to provide a dispersion liquid; (iii) forming a coating film of the dispersion liquid; and (iv) heating the coating film to imidize the polyimide precursor, to thereby form the base layer.

According to yet another aspect of the present disclosure, there is provided a varnish including: a polyimide precursor; carbon nanotubes; and a solvent, wherein the carbon nanotubes each have at least one resin selected from the group consisting of: polyphenylsulfone; polysulfone; and polyethersulfone present on at least part of a surface thereof.

Further features of the present disclosure will become apparent from the following description of exemplary embodiments with reference to the attached drawings.

DESCRIPTION OF THE EMBODIMENTS

Figure 1:
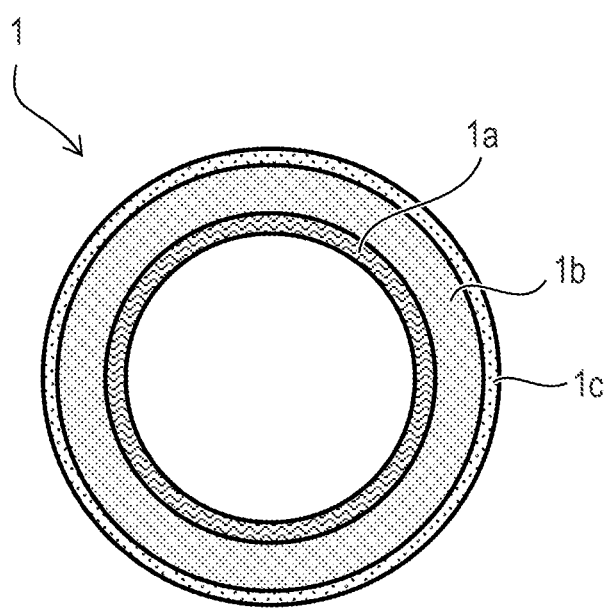
FIG. 1 is a schematic sectional view for illustrating an example of an electrophotographic belt.

In the present disclosure, the description of "at least XX and not more than YY" or "XX to YY" indicating a numerical range means a numerical range including a lower limit and an upper limit which are end points, unless otherwise specified. When the numerical range is described step by step, the upper and lower limits of each numerical range can be arbitrarily combined.

A specific mode for carrying out the present disclosure is described below.

An electrophotographic belt according to one aspect of the present disclosure is an electrophotographic belt having an endless shape including a base layer. The base layer includes a polyimide film containing polyimide serving as a binder resin and carbon nanotubes. The polyimide has an imidization ratio of 80% or more, and the carbon nanotubes each have at least one resin selected from the group consisting of: polyphenylsulfone; polysulfone; and polyethersulfone present on at least part of a surface thereof. In addition, the base layer has a tensile strength of 200 MPa or more in each of a peripheral direction thereof and a direction perpendicular to the peripheral direction. The base layer may preferably have a thermal conductivity of 0.4 W/m·K or more in a thickness direction thereof. The base layer may more preferably have a thermal conductivity of 0.7 W/m or more in the thickness direction thereof.

The at least one resin selected from the group consisting of: the polyphenylsulfone; the polysulfone; and the polyethersulfone is hereinafter also referred to as "coating resin." In addition, the carbon nanotubes each having the coating resin present on at least part of its surface are also referred to as "surface-coated CNTs."

According to an investigation, when the polyimide film was produced in accordance with the disclosure of Japanese Patent Application Laid-Open No. 2006-124613, the mechanical strength of the polyimide film remarkably reduced in some cases. In view of the foregoing, the inventors have made further investigations, and as a result, have found that when a baking temperature for performing the dehydration imidization reaction is set to 350° C. or more, the mechanical strength of a base layer to be obtained may reduce.

In the production of a polyimide film, there is a correlation between the imidization ratio of polyimide in the polyimide film and the mechanical strength of the polyimide film, and hence as the imidization ratio of the polyimide in the polyimide film becomes higher, the polyimide film has higher mechanical strength. In addition, a baking temperature at the time of the production of a polyimide film is generally 300° C. or more, but a higher baking temperature, that is, 350° C. or more is required for the production of a polyimide film having a high imidization ratio, in particular, an imidization ratio of 80% or more.

In other words, when the baking temperature for performing the dehydration imidization reaction is set to 350° C. or more, the imidization ratio of the polyimide in the polyimide film can be increased to 80% or more. Under normal circumstances, a polyimide film having high mechanical strength should be obtained by the increase. However, when the baking temperature was set to 350° C. or more by using the technology described in Japanese Patent Application Laid-Open No. 2006-124613, the mechanical strength of the base layer to be obtained reduced in some cases. The reason for the foregoing is conceived to be as described below.

In the method described in Japanese Patent Application Laid-Open No. 2006-124613, to uniformly disperse the CNTs in the polyimide film, the CNTs are dispersed in the amide-based polar organic solvent containing the nonionic surfactant and/or the PVP before being mixed with the polyimide precursor. Thus, the nonionic surfactant and/or the PVP is present on at least part of the surface of each of the CNTs. Thus, even in the subsequent process in which the CNTs are mixed with the polyimide precursor to perform the dehydration imidization reaction, the aggregation of the CNTs can be suppressed, and hence the polyimide film having uniformly dispersed therein the CNTs can be obtained.

However, when the baking temperature is set to 350° C. or more for increasing the imidization ratio, at least part of the nonionic surfactant and/or the PVP present on the surfaces of the CNTs may be decomposed by high heat to disappear. Probably because of the foregoing, no dispersing effect on the CNTs was obtained, and hence the aggregation of the CNTs occurred in the process of the dehydration imidization reaction to result in a reduction in mechanical strength of the resultant polyimide film.

The same phenomenon as that described above may also occur for a low-molecular weight organic compound (e.g., a surfactant) or a resin that has heretofore been used for uniformly dispersing CNTs in a polyimide film. That is, for example, each of coconut oil, palm oil, a linear alkylbenzene sulfonic acid salt, an α-sulfo fatty acid methyl ester salt, an α-olefin sulfonic acid salt, a formaldehyde condensate of a naphthalene sulfonic acid salt, a polyoxyethylene alkyl sulfuric acid ester salt, an acyl-N-methyltaurine salt, a glycerin fatty acid ester, a sorbitan fatty acid ester, a sucrose fatty acid ester, a polyoxyethylene alkyl ether, a polyoxyethylene alkyl phenyl ether, polyoxyethylene polyoxypropylene glycol, and other low-molecular-weight compounds, a polyester-based, polyacrylic, or polyether-based resin, and a vinyl-based resin, such as PVP or PVA, may be decomposed by being subjected to high baking temperature to disappear.

In the present disclosure, a resin for the surface treatment of CNTs for uniformly dispersing the CNTs in a polyimide film (hereinafter also referred to as "coating resin") is, for example, a resin containing a phenylsulfonyl structure represented by the following general formula (I).

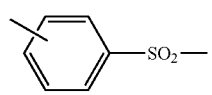
(I)

The coating resin is specifically, for example, at least one resin selected from the group consisting of: polyphenylsulfone (hereinafter referred to as "PPSU"); polysulfone (hereinafter referred to as "PSU"); and polyethersulfone (hereinafter referred to as "PESU"). The PPSU, the PSU, and the PESU are generally represented by the following general formula (II) (PPSU), the following general formula (III) (PSU), and the following general formula (IV) (PESU), respectively. "n" in each of the formulae represents an integer of 1 or more.

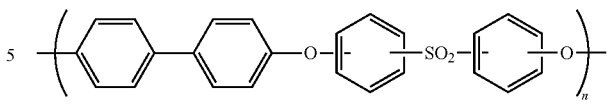
(II)

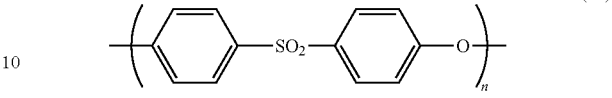
(III)

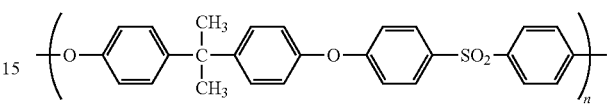
(IV)

The above-mentioned coating resin is excellent in adsorptive power to CNTs. That is, when the coating resin is caused to adhere to at least part of the surface of each of the CNTs to provide surface-coated CNTs, and then the surface-coated CNTs and a polyimide precursor are mixed, the coating resin hardly leaves from the surfaces of the CNTs. Thus, the dispersibility of the surface-coated CNTs can be maintained even after the mixing with the polyimide precursor.

In addition, the resin containing a phenylsulfonyl structure represented by the general formula (I) belongs to a super engineering plastic. The super engineering plastic has heat resistance even higher than that of an engineering plastic, such as polyacetal (POM) or polycarbonate (PC), credited with having high heat resistance.

Specifically, the coating resin to be used in the present disclosure preferably has a temperature at the time of a 1% mass loss in thermogravimetry (TG) of 350° C. to 500° C.

In the present disclosure, the above-mentioned coating resin and the CNTs are mixed so that the coating resin may be caused to adhere to at least part of the surface of each of the CNTs. Then, the surface-coated CNTs thus obtained are dispersed in a solution containing the polyimide precursor, and then the imidization of the precursor is performed.

Herein, even when the imidization is performed at a high baking temperature of, for example, 350° C. or more for increasing the imidization ratio of the polyimide film, the coating resin has high heat resistance, and hence does not decompose. Accordingly, the CNTs can maintain their high dispersed state. That is, the imidization ratio can be increased while the aggregation of the CNTs and a reduction in mechanical strength of the polyimide film due to the aggregation are suppressed. Accordingly, the mechanical strength inherent in the polyimide film can be effectively derived. Thus, in the present disclosure, an electrophotographic belt having both of high mechanical strength and high thermal conductivity can be obtained.

Specifically, in the electrophotographic belt according to one aspect of the present disclosure, its base layer has a tensile strength of 200 MPa or more in each of its peripheral direction and the direction perpendicular to the peripheral direction. Further, the base layer may preferably have a thermal conductivity of 0.4 W/m·K or more in its thickness direction. The thermal conductivity may more preferably be 0.7 W/m·K or more.

The base layer of the electrophotographic belt according to one aspect of the present disclosure may preferably contain 5 to 20 mass % of the above-mentioned coating resin present on the surfaces of the carbon nanotubes with respect to the mass of the carbon nanotubes.

A commercial product may be used as the coating resin, and an example of the PPSU is Ultrason P (BASF) or Radel PPSU (Solvay). In addition, an example of the PSU is Ultrason S (BASF) or Udel PSU (Solvay). In addition, an example of the PESU is Ultrason E (BASF), Veradel PESU (Solvay), SUMIKAEXCEL PES (Sumitomo Chemical Co., Ltd.), or Mitsui PES (Mitsui Fine Chemicals, Inc.).

(CNTs)

From the viewpoint of maintaining the mechanical strength inherent in the polyimide film (preventing a reduction in mechanical strength), CNTs each having a small fiber diameter from which a stress-dispersing effect can be expected are preferred as the CNTs. In addition, from the viewpoint of improving the thermal conductivity of the base layer of the electrophotographic belt, CNTs each having a high thermal conductivity are preferred.

Examples of such CNTs include: a single-wall carbon nanotube (SWCNT) (1 wall); a double-wall carbon nanotube (DWCNT) (2 walls); and a multi-wall carbon nanotube (MWCNT) (3 or more walls).

With regard to the number of walls of the MWCNT, a traditional multi-wall carbon nanotube that cannot be produced with desired walls is regarded as having 10 or more walls (unidentified). In the present disclosure, the number of walls of the MWCNT is not particularly limited.

Further, the CNTs may each contain an element except carbon to the extent that the object of the present disclosure is not inhibited, and examples of the element include, but not limited to, nitrogen, boron, oxygen, and sulfur.

Although the CNTs may each have a structure, such as an armchair-type structure, a zigzag-type structure, or a chiral-type structure, in accordance with the geometric feature of an interatomic bond, CNTs each having any one of the structures may be used in the present disclosure.

Although a method of producing the CNTs is not particularly limited, CNTs produced by the following production methods may be used.

(1) Arc Discharge Method

When arc discharge is performed at about 20 V and about 50 A between carbon rods under an argon or hydrogen atmosphere having a pressure somewhat lower than the atmospheric pressure, a MWCNT is obtained in a cathode deposit. In addition, when arc discharge is performed while a catalyst such as a nickel/cobalt catalyst is mixed into each of the carbon rods, a SWCNT is produced in a substance adhering as soot to the inside of a vessel. An arc discharge method is said to provide a CNT having a small number of defects and satisfactory quality.

(2) Laser Vaporization Method

The irradiation of carbon mixed with a catalyst such as a nickel/cobalt catalyst with the strong pulse light of a YAG laser provides a SWCNT. A SWCNT having a relative high purity can be obtained, and the diameter of the tube can be controlled by changing conditions.

(3) Chemical Vapor Deposition Method (CVD Method)

A CNT is obtained by bringing a carbon compound serving as a carbon source into contact with the fine particles of a catalyst metal at from 500° C. to 1,000° C. There are various variations of, for example, the kind of the catalyst metal and the manner in which the metal is arranged, and the kind of the carbon compound, and both of a MWCNT and a SWCNT can be synthesized by changing the conditions.

In addition, the arrangement of a catalyst on a substrate can provide a CNT vertically aligned with respect to the surface of the substrate. The method is said to be a production method most suitable for large-scale synthesis because a raw material can be supplied as a gas.

The CVD method comes in, for example, the following fluid catalyst method and a method including using a catalyst carried on zeolite.

The fluid catalyst method is a method obtained by developing the above-mentioned chemical vapor deposition method. The fluid catalyst method is not a method including arranging catalyst fine particles on a substrate in advance. In the fluid catalyst method, the catalyst fine particles are, or a catalyst precursor that converts into the catalyst fine particles under CVD conditions is, dispersed in a raw material hydrocarbon (e.g., benzene or toluene). Then, the raw material hydrocarbon having dispersed therein the catalyst fine particles or the catalyst precursor is fed to a reactor heated to about 1,000° C. together with hydrogen, and the materials are caused to react with each other to provide a MWCNT.

A catalyst to be used in the fluid catalyst method is, for example, iron, cobalt, or nickel.

As posttreatment, tar adhering to the CNT is heated to 1,200° C. to be burnt off, and an insufficiently graphitized portion is treated at a high temperature of 2,000° C. to be graphitized.

In addition, in the method including using the catalyst carried on the zeolite, the catalyst powder, that is, iron/cobalt powder is arranged on Y-type zeolite that is one kind of porous silicate. Then, a mixed gas of acetylene and argon is brought into contact with the catalyst powder at from 600° C. to 900° C. Thus, a CNT containing a small amount of impurities is obtained.

A SWCNT and a MWCNT can be separately produced by changing the conditions under which the mixed gas is brought into contact with the catalyst powder. In addition, the shapes of the CNTs to be produced are changed by changing the kind of the zeolite.

In addition to the foregoing, a production method including using a carbyne as a carbon source or a production method including carbonizing a carbon precursor polymer tube is available.

The production method including using the carbyne as a carbon source is a production method including: reducing polytetrafluoroethylene with magnesium to produce the carbyne; and irradiating the carbyne with an electron beam or the like to synthesize a CNT from the carbyne.

In the production method including carbonizing the carbon precursor polymer tube, core/shell particles each formed of a shell formed of a carbon precursor polymer (e.g., polyacrylonitrile) and a core formed of a thermal decomposition volatile polymer (polyethylene) are dispersed in the thermal decomposition volatile polymer. Then, the resultant is subjected to melt spinning so that the core/shell particles may each be extended in a rod shape. After that, the extended particles are subjected to an infusibilizing/carbonizing step to provide CNTs. As described above, the production method including carbonizing the carbon precursor polymer tube is a unique production method.

The CNTs may be preferably multi-wall carbon nanotubes produced by the chemical vapor deposition method (CVD method) because the multi-wall carbon nanotubes are excellent in thermal conductivity. An example of the reason why the multi-wall carbon nanotubes produced by the CVD method are excellent in thermal conductivity is that the CNTs each have a small number of defects on its surface.

The surfaces of the CNTs each have a sheet structure (graphene structure) in which all benzene rings are bonded so as to be adjacent to each other, and each theoretically include SP2 carbon. However, the surfaces may each partially have SP3 carbon in addition to the SP2 carbon depending on a production method for the CNTs. The SP3 carbon has bonded thereto an atom, such as hydrogen, oxygen, or nitrogen. A portion having such SP3 carbon is called a defect.

Heat is conducted through the graphene structure on each of the CNTs, and hence a CNT having many defects is poor in heat conductivity.

A method of evaluating the number of defects in the CNTs is, for example, a method of measuring a G/D ratio in a Raman spectrum.

G in the G/D ratio represents a peak intensity at about 1,590 cm$^{-1}$ in the Raman spectrum, and represents a peak intensity derived from the graphene structure (sheet structure including the SP2 carbon). In addition, D in the G/D ratio represents a peak intensity at about 1,350 cm$^{-1}$ therein, and represents a peak intensity derived from the defects. A larger G/D ratio (larger intensity of the G with respect to the intensity of the D) means that the number of the defects in the CNTs is smaller.

The G/D ratio of the Raman spectrum of the CNTs may be preferably 10 or more, more preferably 15 or more. The use of the CNTs having the G/D ratio of 10 or more is more effective to prepare the polyimide film according to the present disclosure having a thermal conductivity of, for example, 0.7 W/m·K or more in its thickness direction.

(Surface-Coated CNTs)

Although a method of producing the surface-coated CNTs is not particularly limited, the following may be performed: the coating resin is dissolved in a solvent in advance, and the CNTs are loaded into the solution. In addition, the following may be performed: the CNTs are loaded into the solvent, the mixture is stirred, and the coating resin is added to the mixture. In each case, the solvent in which the coating resin is dissolved needs to be prepared.

Although the solvent is not particularly limited as long as the coating resin is dissolved in the solvent, an amide-based solvent may be suitably used because the solvent easily dissolves the coating resin. An example of the amide-based solvent is N-methyl-2-pyrrolidone (NMP), N,N-dimethylacetamide (DMAC), dimethylformamide (DMF), diethylformamide (DEF), N-methylpyrrolidone (MPD), tetramethylurea (TMU), or hexamethylphosphoric amide (HMPA).

The surface-coated CNTs have extremely high heat resistance. Specifically, the temperature of the surface-coated CNTs at the time of a 1% mass loss in thermogravimetry (TG) may be preferably 350° C. or more. In addition, the temperature of the surface-coated CNTs at the time of a 1% mass loss in the thermogravimetry (TG) may be more preferably 400° C. or more, still more preferably 500° C. or more.

The surface-coated CNTs each have such high heat resistance as described above, and hence even when a baking temperature is set to, for example, 350° C. or more for producing a polyimide film having a high imidization ratio, the decomposition or gasification of the CNTs does not occur.

(Varnish)

Next, a varnish according to one aspect of the present disclosure is described. The varnish according to the present disclosure can form a polyimide film according to one aspect of the present disclosure, the film having high mechanical strength and predetermined thermal conductivity in its thickness direction. The varnish includes a polyimide precursor, the surface-coated CNTs, and a solvent.

(Polyimide Precursor)

A polyamic acid or a polyamic acid solution obtained by such a general production method as described below may be used as the polyimide precursor.

First, a production method including causing a tetracarboxylic acid dianhydride and a diamine to react with each other in a solvent under an inert gas atmosphere at normal temperature and normal pressure is available.

The polyamic acid may be immediately obtained by, for example, stirring pyromellitic dianhydride and 4,4'-diaminodiphenyl ether in the solvent.

Such amide-based solvent as described above, or a solvent, such as tetrahydrofuran (THF) or diglyme (diethylene glycol dimethyl ether), may be used as the reaction solvent in accordance with, for example, the kind of the diamine, and the polyamic acid may be obtained as a polyamic acid solution.

The tetracarboxylic acid dianhydride and the diamine are described below.

Examples of the tetracarboxylic acid dianhydride include cyclic tetracarboxylic acid dianhydrides, such as 1,2,3,4-cyclobutanetetracarboxylic dianhydride, 1,2,4,5-cyclohexanetetracarboxylic dianhydride, dicyclohexyl-3,3',4,4'-tetracarboxylic dianhydride, 1,2,4,5-cyclohexanetetracarboxylic dianhydride, 1,2,3,4-cyclobutanetetracarboxylic dianhydride, bicyclo[2.2.2]oct-7-ene-2,3,5,6-tetracarboxylic dianhydride, and hexahydro-4,8-ethano-1H,3H-benzo[1,2-c:4,5-c']difuran-1,3,5,7-tetorone.

The examples also include aromatic tetracarboxylic acid dianhydrides, such as pyromellitic dianhydride, 3,3',4,4'-biphenyltetracarboxylic dianhydride, 2,3,3',4'-biphenyltetracarboxylic dianhydride, 2,2',3,3'-biphenyltetracarboxylic dianhydride, 3,3',4,4'-benzophenonetetracarboxylic dianhydride, 4,4'-oxydiphthalic dianhydride, 3,4'-oxydiphthalic dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 3,3',4,4'-diphenylsulfonetetracarboxylic dianhydride, 4,4-(p-phenylenedioxy)diphthalic dianhydride, 4,4-(m-phenylenedioxy)diphthalic dianhydride, 1,4,5,8-naphthalenetetracarboxylic dianhydride, 3,4,9,10-perylenetetracarboxylic dianhydride, and 9,9-bis(3,4-dicarboxyphenyl)fluorene dianhydride.

Although not particularly limited, an aromatic tetracarboxylic acid dianhydride is preferred as the tetracarboxylic acid dianhydride in terms of the characteristics of polyimide to be obtained.

The tetracarboxylic acid dianhydrides may be used alone or as a mixture thereof.

In addition, examples of the diamine may include: aromatic diamines, such as p-phenylenediamine, m-phenylenediamine, 2,4-diaminotoluene, 2,6-diaminotoluene, p-xylylenediamine, m-xylylenediamine, 4,4'-diaminodiphenyl ether, 3,4'-diaminodiphenyl ether, 4,4'-diaminodiphenylmethane, 1,4-bis(4-aminophenoxy)benzene, 1,3-bis(4-aminophenoxy)benzene, 1,3-bis(3-aminophenoxy)benzene, 3,3'-dimethylbenzidine, 3,3'-dimethoxybenzidine, 3,3'-dihydroxybenzidine, 2,2'-bis(trifluoromethyl)benzidine, 3,3'-bis(trifluoromethyl)benzidine, 2,2-bis[4-(4-aminophenoxy)phenyl]propane, 2,2-bis(4-aminophenyl)hexafluoropropane, 2,2-bis(3-hydroxy-4-aminophenyl)hexafluoropropane, 4,4'-diaminodiphenyl sulfide, 4,4'-diaminodiphenyl sulfone, 3,3'-diaminodiphenyl sulfone, bis[4-(4-aminophenoxy)phenyl] sulfone, bis[4-(3-aminophenoxy)phenyl] sulfone, and bis(3-amino-4-hydroxyphenyl)sulfone; diamines each containing an alicyclic structure, such as di(p-aminocyclohexyl)methane and 1,4-diaminocyclohexane; and aliphatic diamines, such as hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 2,17-diaminoeicosadecane, 1,10-diamino-1,10-dimethyldecane, and 1,12-diaminooctadecane.

Although not particularly limited, an aromatic diamine is preferred as the diamine in terms of the characteristics of polyimide to be obtained.

The diamines may be used alone or as a mixture thereof.

A commercial product may be purchased and used as the polyamic acid or the polyamic acid solution. Specifically, a U-IMIDE series (UNITIKA LTD.), a UPIA series or a U-VARNISH series (Ube Industries, Ltd.), an HCI series (Hitachi Chemical Co., Ltd.), an ECRIOS series (manufactured by Mitsui Chemicals, Inc.), a Pyre-M. L. series (I.S.T Corporation), or the like may be used.

A method of producing the varnish according to the present disclosure is not particularly limited, and the varnish may be obtained by, for example, producing the surface-coated CNTs or a dispersion liquid of the surface-coated CNTs in advance, then loading the CNTs or the dispersion liquid into a solvent containing the polyimide precursor, and mixing the materials with a stirring device.

Although the amount of the surface-coated CNTs to be blended into the varnish is not particularly limited, the blending amount of the surface-coated CNTs may be preferably 1 to 50 vol % with respect to the amount of the polyamic acid. A more preferred blending amount is 10 to 30 vol %. When the blending amount of the surface-coated CNTs with respect to the amount of the polyamic acid in the varnish is 10 vol % or more, the thermal conductivity of the base layer of the electrophotographic belt can be improved, and when the blending amount is 30 vol % or less, the mechanical strength of the base layer can be improved.

(Polyimide Film)

A polyimide film to be used as the base layer of the electrophotographic belt according to the present disclosure may be produced by using the varnish according to the present disclosure. Although a method for the production is not limited, a production method including the following steps is preferred: a step of holding the varnish under heating at a temperature equal to or less than the boiling point of its solvent so that the varnish may have an appropriate viscosity, to thereby evaporate part of the varnish; and a step of holding the remaining varnish while heating the varnish to 300° C. or more for causing an imidization reaction. For example, a bank having a height of about 0.5 mm is produced from a metal plate on a core body, and the varnish is cast thereinto. The varnish is applied to the core body with a bar coater, and the resultant is placed on a hot plate and held at 200° C. for 1 hour so that the solvent may be evaporated. Next, the resultant is held in a muffle furnace at 350° C. for 1 hour. Thus, the polyimide film is obtained.

(Polyimide)

Polyimide in the polyimide film produced as the base layer of the electrophotographic belt according to the present disclosure has an imidization ratio of 80% or more.

The polyimide may be obtained by, for example, heating a precursor solution containing the polyamic acid and the solvent described above to subject the solution to cyclodehydration (imidization).

In the present disclosure, the polyimide is blended with the CNTs, and hence the polyimide may preferably has a high tensile strength and high toughness. When the strength of the polyimide itself is not sufficient, the blending of the CNTs inevitably reduces the toughness of the polyimide, and hence the tensile strength (breaking stress) thereof also reduces. Accordingly, it may be impossible to put the polyimide into practical use. In addition, when the polyimide is used as the base layer of a fixing belt, the polyimide is required to have higher heat resistance (glass transition temperature) for preventing its deformation due to heat applied from a heater.

In view of the foregoing, polyimide molded by using a polyamic acid obtained by causing 3,3',4,4'-biphenyltetracarboxylic dianhydride and p-phenylenediamine to react with each other is most preferred.

(Electrophotographic Belt)

FIG. 1 is a schematic sectional view for illustrating an example of the electrophotographic belt according to the present disclosure. An electrophotographic belt 1 includes: a base layer 1a formed of the polyimide film described above; and a surface layer 1c serving as a release layer on the outer peripheral surface of the base layer 1a, the surface layer containing at least a fluorine resin.

The thickness of the base layer 1a may be preferably from 40 to 150 μm.

The surface layer 1c contains the fluorine resin, and serves to prevent the adhesion of toner by virtue of low surface energy of the fluorine resin. A product obtained by molding the fluorine resin into a tube shape is used as the surface layer 1c containing the fluorine resin. In addition, for example, a tetrafluoroethylene-perfluoro(alkyl vinyl ether) copolymer (PFA), polytetrafluoroethylene (PTFE), or a tetrafluoroethylene-hexafluoropropylene copolymer (FEP) is used as the fluorine resin. Of the materials exemplified and listed above, a PFA is preferred as the fluorine resin from the viewpoints of moldability and toner releasability.

The thickness of the surface layer 1c may be preferably 50 μm or less. This is because when the electrophotographic belt 1 includes an elastic layer 1b below the surface layer 1c, the elasticity of the elastic layer 1b is maintained, and hence the surface hardness of the electrophotographic belt 1 can be suppressed from becoming excessively high.

The inner surface of the fluorine resin tube may be improved in adhesive property by being subjected to, for example, sodium treatment, excimer laser treatment, or ammonia treatment in advance.

Further, the elastic layer 1b formed of a silicone rubber may be additionally arranged as an intermediate layer between the base layer 1a and the surface layer 1c. The elastic layer 1b functions as, for example, an elastic layer for imparting elasticity to a fixing member for applying a uniform pressure to a toner image and the irregularities of a recording material at the time of toner fixation. To express such function, an addition reaction-crosslinkable liquid silicone rubber may be preferably used as a material for the elastic layer 1b because of, for example, the following reasons: the rubber is easy to process; the rubber can be processed with high dimensional accuracy; and the rubber does not produce any reaction by-product at the time of its heat curing. In addition, the elasticity of the rubber can be adjusted by adjusting the crosslinking degree thereof in accordance with the kind and addition amount of a filler to be described later.

The addition reaction-crosslinkable liquid silicone rubber generally contains: organopolysiloxane having an unsaturated aliphatic group; organopolysiloxane having active hydrogen bonded to silicon; and a platinum compound serving as a crosslinking catalyst. The organopolysiloxane having active hydrogen bonded to silicon is caused to react with an alkenyl group of the organopolysiloxane component having an unsaturated aliphatic group by the catalytic action of the platinum compound to form a crosslinked structure.

The elastic layer 1b may contain a filler for, for example, improving the thermal conductivity of the electrophotographic belt 1, reinforcing the belt, and improving the heat resistance thereof.

In particular, the filler may be preferably highly thermally conductive for the purpose of improving the thermal conductivity of the electrophotographic belt. Specifically, a material for the highly thermally conductive filler may be, for example, inorganic matter, in particular, a metal or a metal compound.

Specific examples of the material for the highly thermally conductive filler include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni). Those materials may be used alone or as a mixture thereof.

The average particle diameter of the highly thermally conductive filler may be preferably 1 to 50 μm from the viewpoints of handling and dispersibility. In addition, examples of the shape of the highly thermally conductive filler include a spherical shape, a pulverized shape, a plate shape, and a whisker shape. Of those, a spherical shape is preferred from the viewpoint of dispersibility.

The thickness of the elastic layer 1b may be preferably 100 to 500 μm, more preferably 200 to 400 μm in terms of contribution to the surface hardness of the electrophotographic belt and the efficiency of heat conduction to unfixed toner at the time of its fixation when the belt is used as a fixing belt.

A method of producing the electrophotographic belt according to the present disclosure is, for example, a method of producing an electrophotographic belt including the following steps (i) to (iv):

(i) a step of causing at least one resin selected from the group consisting of: polyphenylsulfone; polysulfone; and polyethersulfone to adhere to at least part of the surface of each of carbon nanotubes;

(ii) a step of dispersing the carbon nanotubes each having the resin caused to adhere to at least part of its surface, which have been obtained in the step (i), in a solution containing a polyimide precursor to provide a dispersion liquid;

(iii) a step of forming a coating film of the dispersion liquid; and (iv) a step of heating the coating film to imidize the polyimide precursor, to thereby form the base layer of the belt.

A baking temperature for the imidization in the above-mentioned step (iv) may be at least 250° C. to 400° C., preferably 300° C. to 400° C., more preferably 350° C. to 400° C.

The method of producing an electrophotographic belt may further include a step of heating the coating film to, for example, from 50° C. to 250° C. to remove its solvent, to thereby cure the coating film after the above-mentioned step (iii) and before the above-mentioned step (iv).

(Fixing Device)

An example of a fixing device using the electrophotographic belt according to one aspect of the present disclosure as a fixing belt is described below.

Figure 2:
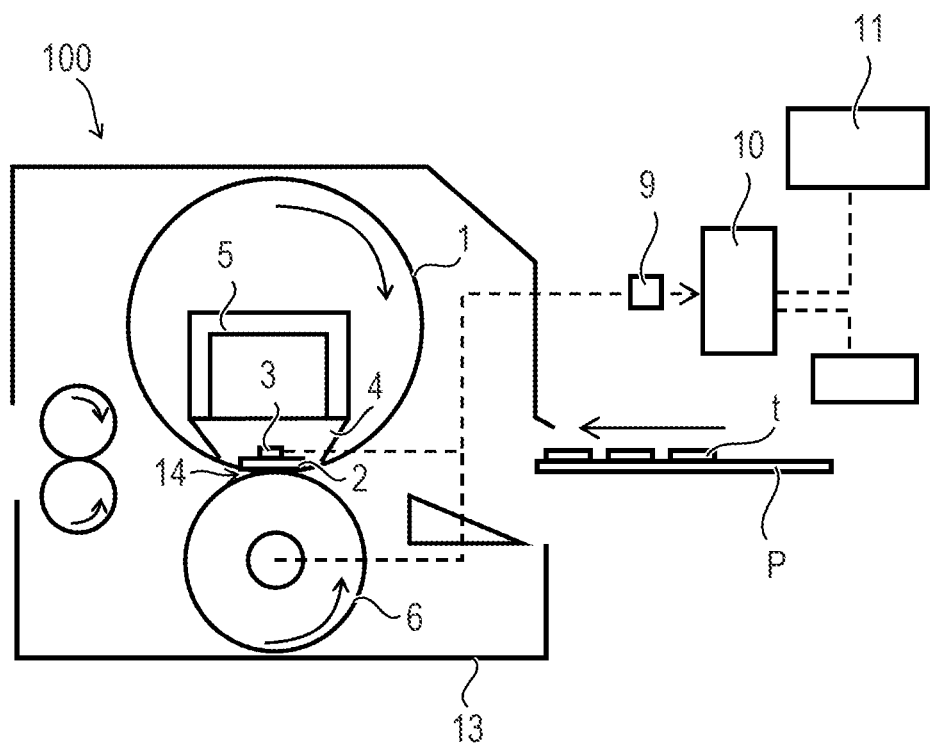
FIG. 2 is a schematic sectional view for illustrating an example of a fixing device.

FIG. 2 is a schematic sectional view for illustrating an example of a fixing device 100 using the electrophotographic belt according to the present disclosure as a fixing belt.

The fixing device 100 includes: the electrophotographic belt 1 serving as a cylindrical fixing belt (endless belt), the belt including an elastic layer; and a pressurizing roller 6 serving as a pressurizing member for forming a fixing nip portion 14 with the fixing belt. In addition, the fixing device 100 includes a fixing heater 2 serving as a heating unit and a film guide-cum-heater holder 4 having heat resistance.

The fixing heater 2 is fixed to the lower surface of the film guide-cum-heater holder 4 along the longitudinal direction of the film guide-cum-heater holder 4, and has such a configuration that its heating surface is slidable with respect to the electrophotographic belt 1. In addition, the electrophotographic belt 1 is fit onto the film guide-cum-heater holder 4 with some degree of freedom. The film guide-cum-heater holder 4 is formed of a liquid crystal polymer resin having high heat resistance, and serves to hold the fixing heater 2 and to turn the electrophotographic belt 1 into a shape for allowing the belt to be separated from a recording material P.

The pressurizing roller 6 has, for example, a multilayer structure in which a silicone rubber layer having a thickness of about 3 mm and a PFA resin tube having a thickness of about 40 μm are sequentially laminated on a stainless steel-made cored bar. Both the end portions of the cored bar of the pressurizing roller 6 are rotatably bearing-held between the back-side and front-side side plates (not shown) of a device frame 13.

A fixing unit including the fixing heater 2, the film guide-cum-heater holder 4, a fixing belt stay 5, and the electrophotographic belt 1 is arranged on the upper side of the pressurizing roller 6 in FIG. 2. The fixing unit is arranged parallel to the pressurizing roller 6 with its fixing heater 2 side directed downward.

One-end sides of both the end portions of the fixing belt stay 5 are energized toward the pressurizing roller 6 by a pressurizing mechanism (not shown) with, for example, a force of 156.8 N (16 kgf) each, that is, a total force of 313.6 N (32 kgf). As a result, the lower surface (heating surface) of the fixing heater 2 is brought into pressure contact against the elastic layer of the pressurizing roller 6 through the electrophotographic belt 1 with a predetermined pressing force, and hence the fixing nip portion 14 having a predetermined width required for the fixation of toner "t" on the recording material P is formed.

A thermistor 3 (heater temperature sensor) serving as a temperature-detecting unit is arranged on the rear surface (surface opposite to the heating surface) of the fixing heater 2, which is a heat source, to bear a function of detecting the temperature of the fixing heater 2.

The pressurizing roller 6 is rotationally driven in an arrow direction at a predetermined peripheral speed. The electrophotographic belt 1 in such a relationship as to be brought into pressure contact therewith rotates at a predetermined speed following the pressurizing roller 6. At this time, the following state is established: the inner surface of the electrophotographic belt 1 rotates around the circumference of the film guide-cum-heater holder 4 in the arrow direction following the fixing heater 2 while being brought into close contact with the lower surface of the fixing heater 2 to slide with respect thereto.

A semisolid lubricant is applied to the inner surface of the electrophotographic belt 1 to secure slidability between the film guide-cum-heater holder 4 and the inner surface of the electrophotographic belt 1.

The thermistor 3 is arranged so as to be brought into contact with the rear surface of the fixing heater 2, and is connected to a control circuit portion (CPU) 10 serving as a controlling unit through an A/D converter 9. The control circuit portion (CPU) 10 samples respective outputs from the thermistor 3 at a predetermined cycle, and is configured to reflect temperature information thus obtained in temperature control. In other words, the control circuit portion (CPU) 10 determines the temperature control contents of the fixing heater 2 based on the outputs of the thermistor 3. Thus, the control circuit portion (CPU) 10 serves to control electrification to the fixing heater 2 by a heater-driving circuit portion 11, which is a power-supplying portion, for causing the temperature of the fixing heater 2 to reach a target temperature (preset temperature). In addition, the control circuit portion (CPU) 10 also serves to control a sequence for estimating the lifetime of the fixing belt, and is connected to the driving motor of the pressurizing roller 6 through the A/D converter 9.

The fixing heater 2 includes: an alumina substrate; and a resistance heating element obtained by applying an electroconductive paste containing a silver-palladium alloy thereonto in a uniform film shape having a thickness of about 10 μm by a screen printing method. The heater is a ceramic heater in which the top of the resistance heating element is further coated with pressure-resistant glass.

(Electrophotographic Image Forming Apparatus)

An example of an electrophotographic image forming apparatus including the above-mentioned fixing device including the electrophotographic belt according to the present disclosure is described below.

Figure 3:
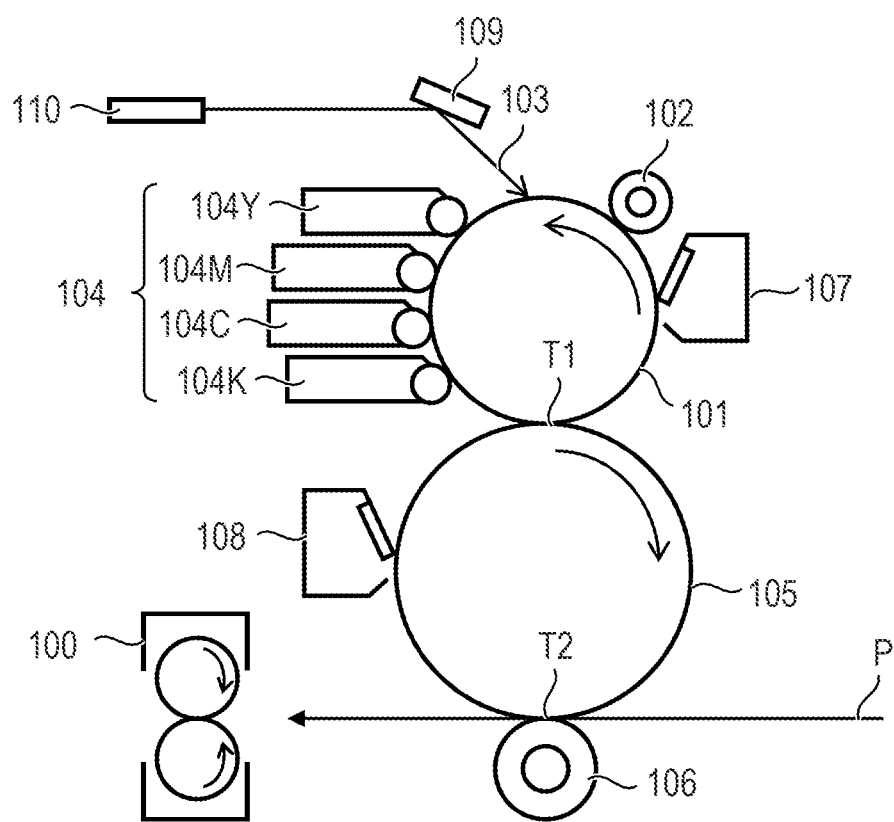
FIG. 3 is a schematic sectional view for illustrating an example of an electrophotographic image forming apparatus.

FIG. 3 is a schematic sectional view for illustrating an example of the electrophotographic image forming apparatus according to the present disclosure.

A photosensitive drum 101 serving as an image-bearing member is rotationally driven in a counterclockwise direction indicated by the arrow at a predetermined process speed (peripheral speed). The photosensitive drum 101 is subjected to charging treatment to predetermined polarity by a charging device 102 such as a charging roller in the process of the rotation.

Next, the charging-treated surface is subjected to exposure treatment by laser light 103 output from a laser optical system 110 based on input image information. The laser optical system 110 outputs the laser light 103, which has been modulated (turned on or off) in correspondence with the time-series electric digital pixel signal of target image information from an image signal generator such as an image-reading device (not shown), to scan and expose the surface of the photosensitive drum 101. As a result, an electrostatic latent image corresponding to the image information is formed on the surface of the photosensitive drum 101 by the scanning exposure. A mirror 109 deflects the laser light 103 output from the laser optical system 110 toward the exposure position of the photosensitive drum 101.

Then, the electrostatic latent image formed on the photosensitive drum 101 is visualized with yellow toner by a yellow developing unit 104Y out of a developing device 104. The yellow toner image is transferred onto the surface of an intermediate transfer drum 105 in a primary transfer portion T1 that is a portion of contact between the photosensitive drum 101 and the intermediate transfer drum 105.

The toner remaining on the surface of the photosensitive drum 101 is cleaned off by a cleaner 107.

Such process cycle of the charging, the exposure, the development, the primary transfer, and the cleaning as described above is similarly repeated with a view to forming a magenta toner image (a developing unit 104M operates), a cyan toner image (a developing unit 104C operates), and a black toner image (a developing unit 104K operates). The toner images of the respective colors sequentially superimposed and formed on the intermediate transfer drum 105 as described above are secondarily transferred onto the recording material P in a collective manner in a secondary transfer portion T2 that is a portion of contact between the drum and a transfer roller 106. The toner remaining on the intermediate transfer drum 105 is cleaned off by a toner cleaner 108.

The toner cleaner 108 is made separable from the intermediate transfer drum 105, and is configured to be brought into a state of being in contact with the intermediate transfer drum 105 only when the intermediate transfer drum 105 is cleaned. In addition, the transfer roller 106 is also made separable from the intermediate transfer drum 105, and is configured to be brought into a state of being in contact with the intermediate transfer drum 105 only at the time of the secondary transfer.

The recording material that has passed through the secondary transfer portion T2 is introduced into the fixing device 100 serving as an image-heating device, and is subjected to treatment in which the unfixed toner images carried thereon are fixed (image-heating treatment). Then, the recording material subjected to the fixing treatment is discharged to the outside of the electrophotographic image forming apparatus. Thus, a series of image-forming operations is completed.

According to at least one aspect of the present disclosure, there can be obtained the electrophotographic belt having high mechanical strength and having predetermined thermal conductivity in its thickness direction. In addition, according to at least one aspect of the present disclosure, there can be obtained the method of producing an electrophotographic belt having high mechanical strength and having predetermined thermal conductivity in its thickness direction. Further, according to at least one aspect of the present disclosure, there can be obtained the varnish that can provide a polyimide film having predetermined thermal conductivity in the thickness direction thereof and excellent in mechanical strength.

EXAMPLES

Examples according to the present disclosure are described below, but the present disclosure is not limited to the following description concerning Examples.

As described in Examples below, surface-coated CNTs were produced in advance, and were then mixed with a polyimide precursor to prepare a varnish.

[Coating Resin]

Commercial products described below were used as coating resins. In addition, the following commercial products were used as resins used for being caused to adhere to the surfaces of CNTs in Comparative Examples (hereinafter referred to as "comparative resins").

Coating resin 1 (PPSU): Ultrason P3010 (product name, manufactured by BASF)
Coating resin 2 (PSU): Ultrason S 3010 (product name, manufactured by BASF)
Coating resin 3 (PESU): Ultrason E 1010 (product name, manufactured by BASF)

Comparative resin 1 (PVP): Luviskol K 30 (product name, manufactured by BASF)

Comparative resin 2 (polyoxyethylene sorbitan monolaurate): Tween 20 (product name, manufactured by Tokyo Chemical Industry Co., Ltd.)

[CNTs]

CNTs used in Examples and Comparative Examples are described below.

CNTs 1: VGCF-H (product name, manufactured by Showa Denko K.K.)

CNTs 2: VGCF (product name, manufactured by Showa Denko K.K.)

CNTs 3: L-60100 (product name, manufactured by NTP)

CNTs 4: L-1020 (product name, manufactured by NTP)

[Polyamic Acid]

Polyamic acid (hereinafter also referred to as "PAA") solutions used in Examples and Comparative Examples are described below.

PAA 1: U-VARNISH S301
(product name, manufactured by Ube Industries, Ltd., polyamic acid content: 18 mass %)

PAA 2: U-IMIDE AH
(product name, manufactured by UNITIKA Ltd., polyamic acid content: 18 mass %)

PAA 3: JIV-1002
(product name, manufactured by JFE Chemical Corporation, polyamic acid content: 18 mass %)

The evaluations of the respective physical properties of the above-mentioned respective materials are described below.

(Heat Resistance of Each of Coating Resins and Comparative Resins)

To compare the heat resistance of each of the coating resin 1 to the coating resin 3, and the heat resistance of the comparative resin 1 or the comparative resin 2, temperatures at the time of a 1% mass loss in thermogravimetry (TG) are shown in Table 1.

(Adsorptive Powers of Coating Resins and Comparative Resins to CNTs)

The adsorptive powers of the coating resins or the comparative resins to CNTs, and the adsorptive powers of the polyamic acids (hereinafter referred to as "PAAs") to the CNTs were compared by the following two approaches:

(1) an approach including using Hansen solubility parameters; and (2) an approach including using pulse NMR.

(1) Approach including using Hansen Solubility Parameters

The Hansen solubility parameters (hereinafter referred to as "HSPs") are values used for predicting an interaction between substances, and are indicators known in a field where a dispersion is handled. A theory for the HSPs is described in, for example, "Proceedings of the Coal Science Conference, 55, P86 to P89 (2018)."

The HSPs include the following three parameters (unit: $MPa^{0.5}$).

$\delta d$: Energy produced by an intermolecular dispersion force $\delta p$: Energy produced by an intermolecular dipole interaction $\delta h$: Energy produced by an intermolecular hydrogen bond Those three parameters can be regarded as coordinates in a three-dimensional space (Hansen space). In addition, the parameters show that when the HSPs of two substances are placed in the Hansen space, as a distance between the two points (hereinafter referred to as "Ra") becomes shorter, the substances more easily interact with each other.

That is, a distance between two points when the HSPs of CNTs and each of the coating resins are placed in the Hansen space is represented by $Ra_{(CNT\text{-}coating\ and\ resin)}$, a distance between two points when the HSPs of the CNTs and each of the PAAs are placed in the Hansen space is represented by $Ra_{(CNT\text{-}PAA)}$. At this time, when the $Ra_{(CNT\text{-}coating\ resin)}$ is smaller than the $Ra_{(CNT\text{-}PAA)}$, the coating resin has a stronger interaction with the CNTs than the PAA does. Accordingly, when surface-coated CNTs and the PAA are mixed, the following can be suppressed: the coating resin present on the surfaces of the CNTs is replaced with the PAA, and hence the coating resin leaves from the surfaces of the CNTs.

The $Ra_{(CNT\text{-}coating\ resin)}$ of each of the coating resin 1 to the coating resin 3, and the comparative resin 1 and the comparative resin 2 to the CNTs 1 is shown in Table 1. The $Ra_{(CNT\text{-}PAA)}$ of the PAA 1 to the CNTs 1 is 16.1.

TABLE 1

| Resin | Coating resin 1 PPSU | Coating resin 2 PSU | Coating resin 3 PESU | Comparative resin 1 PVP | Comparative resin 2 Tween 20 |
|---|---|---|---|---|---|
| Temperature at time of 1% mass loss in TG (° C.) | 534 | 530 | 525 | 300 | 348 |
| $Ra_{(CNT\text{-}coating\ resin)}$ | 8.9 | 7 | 10.3 | 3.4 | 16.2 |

According to Table 1, the $Ra_{(CNT\text{-}coating\ resin)}$ of each of the coating resin 1 to the coating resin 3 is smaller than the $Ra_{(CNT\text{-}PAA)}$ (16.1). Accordingly, even when surface-coated CNTs obtained by using any one of the coating resin 1 to the coating resin 3 and the PAA 1 are mixed, the adsorption of each of the coating resin 1 to the coating resin 3 on the surfaces of the CNTs 1 may be held. In addition, the comparative resin 1 has low heat resistance, but the $Ra_{(CNT\text{-}coating\ resin)}$ of the comparative resin 1 is smaller than the $Ra_{(CNT\text{-}PAA)}$ (16.1). Accordingly, even when the CNTs 1 having the comparative resin 1 caused to adhere to their surfaces and the PAA 1 are mixed, the adsorption of the comparative resin 1 on the surfaces of the CNTs 1 may be held. Meanwhile, the comparative resin 2 has high heat resistance, but the $Ra_{(CNT\text{-}coating\ resin)}$ of the comparative resin 2 is larger than the $Ra_{(CNT\text{-}PAA)}$ (16.1). Accordingly, when the CNTs 1 having the comparative resin 2 caused to adhere to their surfaces and the PAA 1 are mixed, there may be a high risk in that the comparative resin 2 leaves from the surfaces of the CNTs 1.

(2) Approach Including Using Pulse NMR

An approach including using pulse NMR is available as an approach to comparing adsorptive powers in a solution, and can provide relaxation information on solvent movement (an observation atomic nucleus is 1H). Reference may be made to a method described in "Journal of the Imaging Society of Japan, 55(2), P160 to P165 (2016)" for the outline or operation method of the approach.

The term "relaxation" refers to a process in which energy that has been absorbed once attenuates. Suppose, for example, that N-methyl-2-pyrrolidone (hereinafter referred to as "NMP") is used as a solvent. At this time, when NMP in a free state of being out of contact with the surfaces of CNTs is brought into contact with the surfaces of the CNTs, the excited nuclear spin of NMP is relaxed by energy exchange with the nuclear spin of each of the CNTs. When no coating resin is present on the surfaces of the CNTs, the molecules of NMP that is the solvent are brought into contact with the surfaces of the CNTs at a high frequency, and hence the relaxation time of NMP is remarkably short. Meanwhile, when the relaxation time is measured under the same conditions, in the case where a coating resin is present on the surfaces of the CNTs, as the amount of the coating resin on the surfaces of the CNTs becomes larger, the frequency at which NMP that is the solvent is brought into contact with the surfaces of the CNTs reduces to lengthen the relaxation time of NMP.

Figure 4:
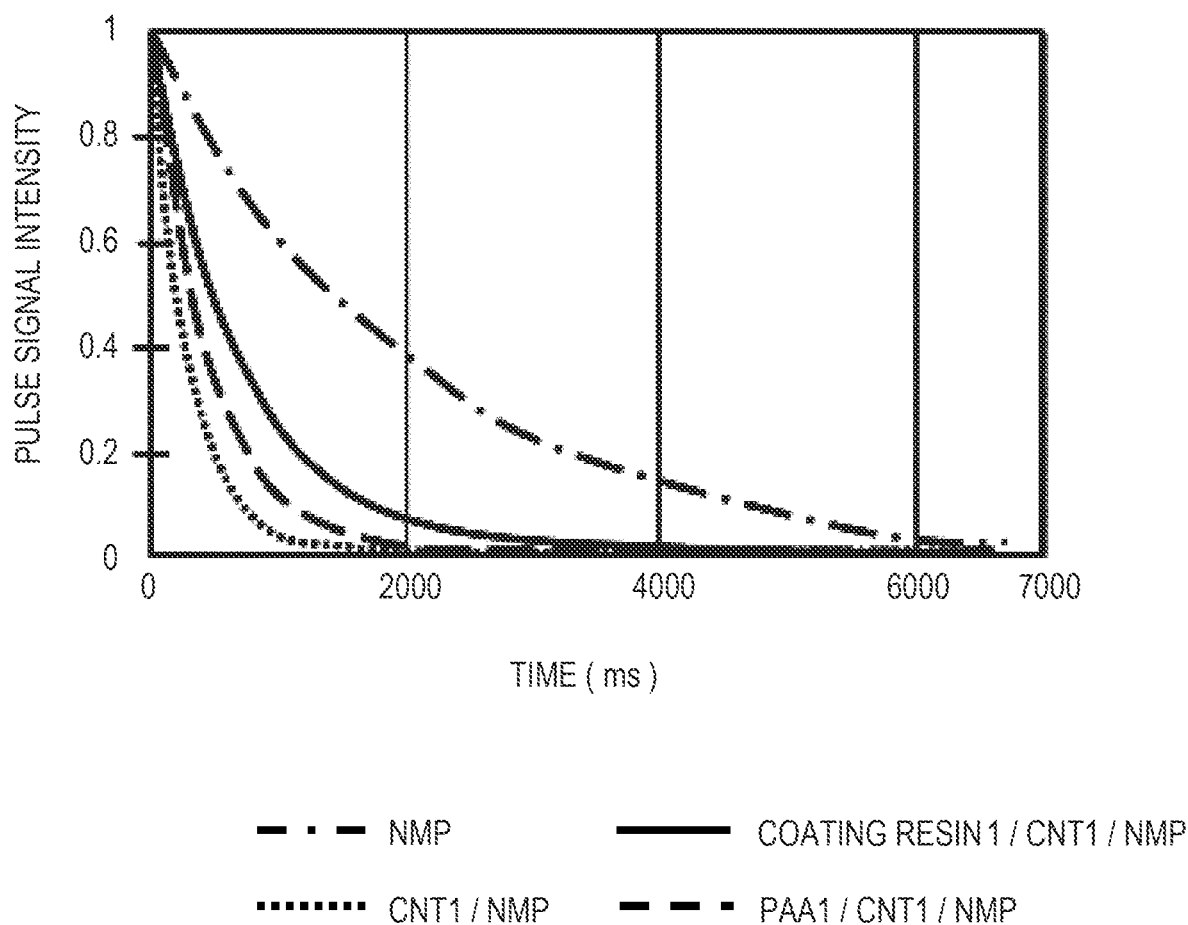
FIG. 4 is a graph for showing an energy attenuation curve obtained by a pulse NMR method.

The energy attenuation curves of NMP in the pulse NMR in the case of a mixed liquid of the CNTs 1, the coating resin 1, and NMP serving as a solvent, and in the case of a mixed liquid of the CNTs 1, the PAA 1, and NMP serving as a solvent are shown in FIG. 4. The curves each show that as the gradient of the curve becomes sharper, that is, as a pulse signal intensity reduces to a larger extent with the lapse of time, the adsorption of the coating resin or the PAA to the CNTs is suppressed to a larger extent.

It is conceivable from FIG. 4 that the PAA 1 does not stably adsorb to the surfaces of the CNTs 1, and hence the surfaces of the CNTs 1 are each brought into an exposed state to shorten the attenuation time of NMP. Meanwhile, it is conceivable that the coating resin 1 strongly adsorbs to the surfaces of the CNTs 1 to coat the surfaces of the CNTs 1, and hence the attention time of NMP is long.

(Thermal Conductivity of Each of CNTs)

To evaluate the thermal conductivity of each of CNTs, the G/D ratio of their Raman spectrum was determined. As described above, as the value of the G/D ratio becomes larger, the number of defects in the CNTs becomes smaller, and hence the CNTs each have a high thermal conductivity.

The G/D ratio was calculated as the ratio of the peak height of a band (G band) at 1,590 $cm^{-1}$ resulting from a graphene structure to the peak height of a band (D band) at 1,350 $cm^{-1}$ resulting from the defects of the graphene structure in the Raman spectrum. A 3D laser Raman microspectroscopy system (product name: Nanofinder 30; manufactured by Tokyo Instruments, Inc.) was used in Raman spectroscopy. Measurement conditions were set as follows: an excitation laser light source wavelength was 532 nm, a wavenumber fell within the range of from 900 to 2,000, a diffraction grating had a grating constant of 1,200 lines/mm, and an exposure time was 30 seconds.

Figure 5:
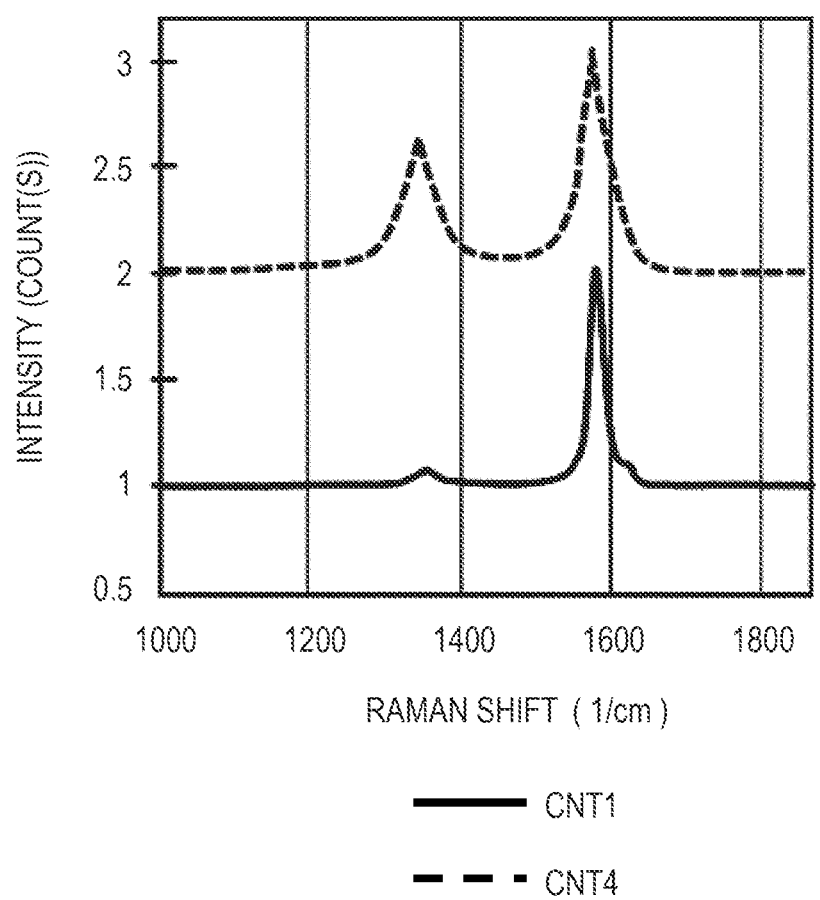
FIG. 5 is a graph for showing Raman spectra for CNTs.

The Raman spectra of the CNTs 1 and the CNTs 4 are shown as examples in FIG. 5. In addition, the fiber diameters, fiber lengths, and G/D ratios of the CNTs 1 to the CNTs 4 are shown in Table 2.

TABLE 2

|  | CNTs 1 | CNTs 2 | CNTs 3 | CNTs 4 |
| --- | --- | --- | --- | --- |
| Fiber diameter (nm) | 150 | 150 | 80 | 15 |
| Fiber length (μm) | 6 | 6 | 5 | 5 |
| G/D ratio | 15.1 | 14.8 | 3.7 | 1.8 |

As shown in FIG. 5 and Table 2, the CNTs 1 or the CNTs 2 have a large G/D ratio. In particular, the CNTs 1 have a G/D ratio of 15 or more, and hence the CNTs each have an extremely small number of defects. Accordingly, the CNTs are suitable from the viewpoint of an improvement in thermal conductivity.

[Imidization Ratio of Polyamic Acid with Respect to Baking Temperature]

An imidization ratio was calculated by measuring the infrared absorption spectrum of a sample with a Fourier transform infrared spectrophotometer Spectrum 3 FT-IR (manufactured by PerkinElmer, Inc.). The measurement was performed by a one-reflection ATR method on a germanium crystal.

Specifically, the ratio "A/B" of the absorbance "A" of C=O stretching vibration derived from an imide group at 1,710 $cm^{-1}$ with respect to an absorbance "B" derived from a benzene ring absorption band at about 1,515 $cm^{-1}$ was measured. The imidization ratio was calculated from the equation "imidization ratio=(A/B)×100/1.7" on the assumption that the absorbance ratio "A/B" when the sample was completely imidized was 1.7.

Figure 7:
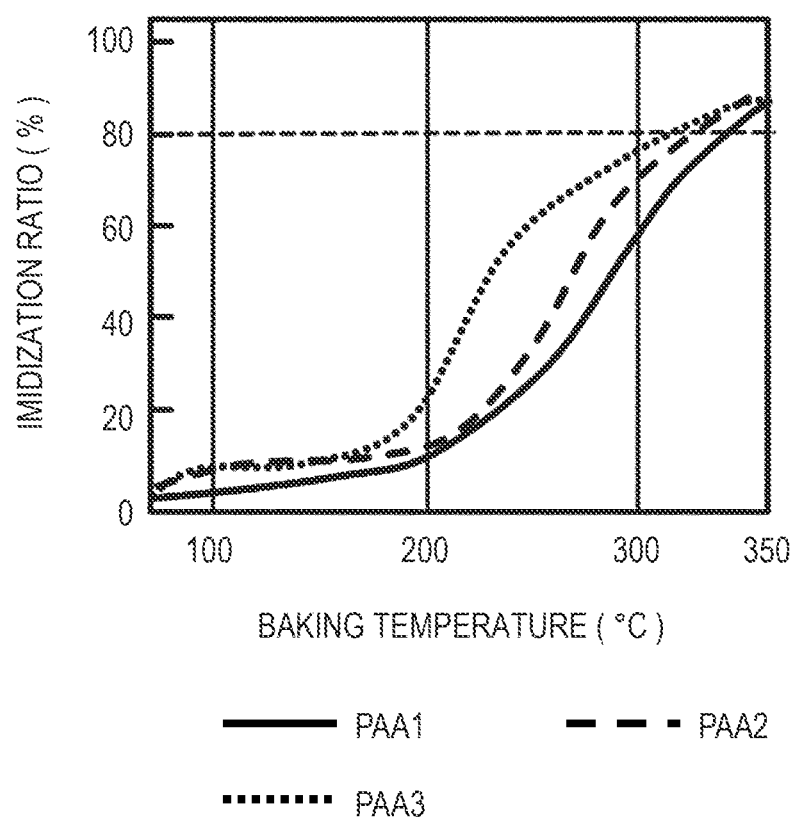
FIG. 7 is a graph for showing a relationship between a baking temperature and an imidization ratio.

The imidization ratios of the PAAs 1 to 3 with respect to a baking temperature are shown in FIG. 7.

As shown in FIG. 7, the imidization of each of the PAAs rapidly advances at a baking temperature of from about 200° C. to about 300° C., the imidization ratio thereof starts to be saturated at about 350° C. to reach 80% or more, and the imidization ratio is assumed to be saturated at about 400° C.

(Evaluation of Adsorption of Coating Resin to Surfaces of CNTs)

To recognize the adsorption of a coating resin to the surfaces of CNTs, an adsorption isotherm in the combination of the CNTs 1 and the coating resin 1 was produced as an example. When the adsorption isotherm is a curve in conformity with Langmuir's adsorption isotherm equation, the isotherm serves as grounds for the occurrence of the adsorption (monomolecular adsorption) of the first layer of the coating resin. In addition, a state in which the surfaces of the CNTs are coated with the coating resin, and hence its adsorption is completed (adsorption saturation) can be recognized by identifying the point at which the adsorption isotherm changes from the curve in conformity with Langmuir's adsorption isotherm equation to a curve in conformity with a multimolecular adsorption isotherm equation.

Figure 6:
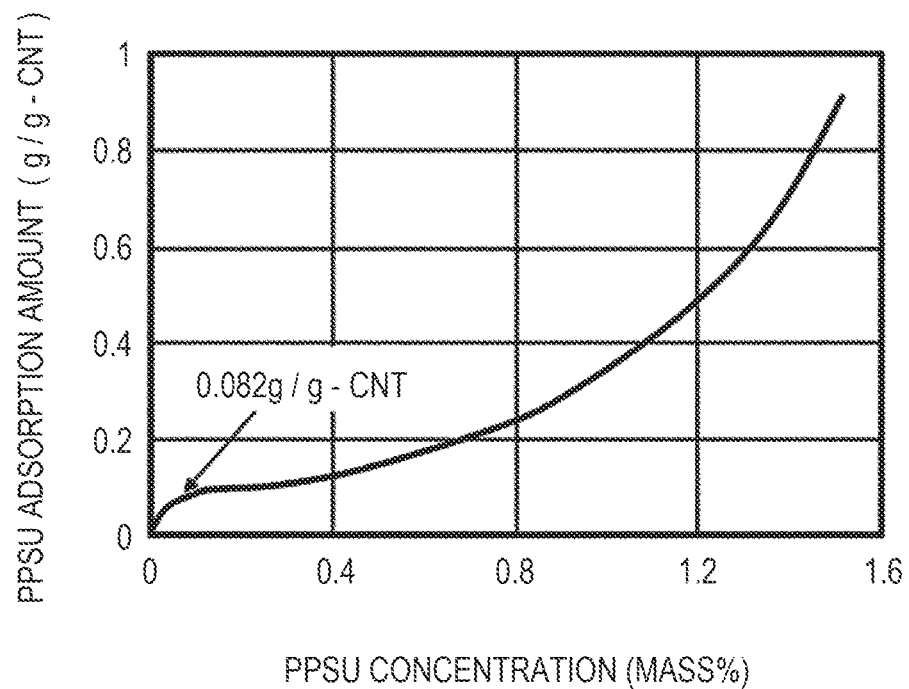
FIG. 6 is a graph for showing the adsorption isotherm of a coating resin for the surfaces of CNTs.

First, 1 g of the CNTs 1 and an arbitrary amount of a 5 mass % solution of the coating resin 1 in NMP were loaded into a vessel, and an additional solvent (NMP/methyl alcohol=3/1.2) was added to provide a mixed solution having a total amount of 66.66 g. 30 Grams of glass beads (φ1 mm) were loaded into the mixed solution, and the mixture was shaken with a paint shaker (Toyo Seiki Seisaku-sho, Ltd.) for 2 hours, followed by the removal of the glass beads. Thus, a dispersion liquid was obtained. The dispersion liquid was subjected to solid-liquid separation by centrifugation (12,000 revolutions, 2.5 hours), and the supernatant was fractionated. The amount of the coating resin 1 in the supernatant was calculated from its HPLC analysis, and the amount of the coating resin 1 on a solid side was calculated, followed by the determination of the amount of the coating resin 1 per unit weight (1 g) of the CNTs 1. Thus, the adsorption isotherm in the CNTs 1 and the coating resin 1 was produced (see FIG. 6).

The produced adsorption isotherm was a bent curve, and was able to be fitted with, for example, the following two equations described in "Journal of the Agricultural Engineering Society, Japan, Vol. 68, No. 4, P351 to P361": Langmuir's adsorption isotherm equation and the multimolecular adsorption isotherm equation.

It was able to be recognized from the above-mentioned adsorption isotherm that the coating resin 1 strongly adsorbed to the CNTs 1 in the mixed solvent of NMP and methyl alcohol. Further, the time point when the CNTs 1 were each coated with one layer of the coating resin 1, and hence its adsorption was generally completed was able to be recognized. The amount of the coating resin 1 with respect to the unit weight (1 g) of the CNTs 1 at the time point when the adsorption was generally completed was estimated. As a result, the amount was 0.082 g/g-CNT.

Example 1

(Production of Surface-Coated CNTs 1)

1 Gram of the CNTs 1 and 1.8 g of a 5 mass % solution of the coating resin 1 in NMP were loaded into a vessel, and an additional solvent (NMP/methyl alcohol=3/1.2) was added to provide a mixed solution having a total amount of 66.66 g. 30 Grams of glass beads (φ1 mm) were loaded into the mixed solution, and the mixture was shaken with a paint shaker (Toyo Seiki Seisaku-sho, Ltd.) for 2 hours, followed by the removal of the glass beads. Thus, a dispersion liquid was obtained. The dispersion liquid was subjected to solid-liquid separation by centrifugation (12,000 revolutions, 2.5 hours), and the supernatant was removed. Thus, a sediment containing surface-coated CNTs 1 was obtained.

Next, the amount of the coating resin 1 in the supernatant was calculated by the high performance liquid chromatography analysis (hereinafter referred to as "HPLC analysis") of the supernatant. The coating amount of the surface-coated CNTs 1 (amount (g) of the coating resin 1 per unit weight (1 g) of the CNTs) was determined by using a value obtained by subtracting the calculated value from the amount of the coating resin 1 that had been loaded first. As a result, the coating amount was 0.082 g/g-CNT.

Figure 8:
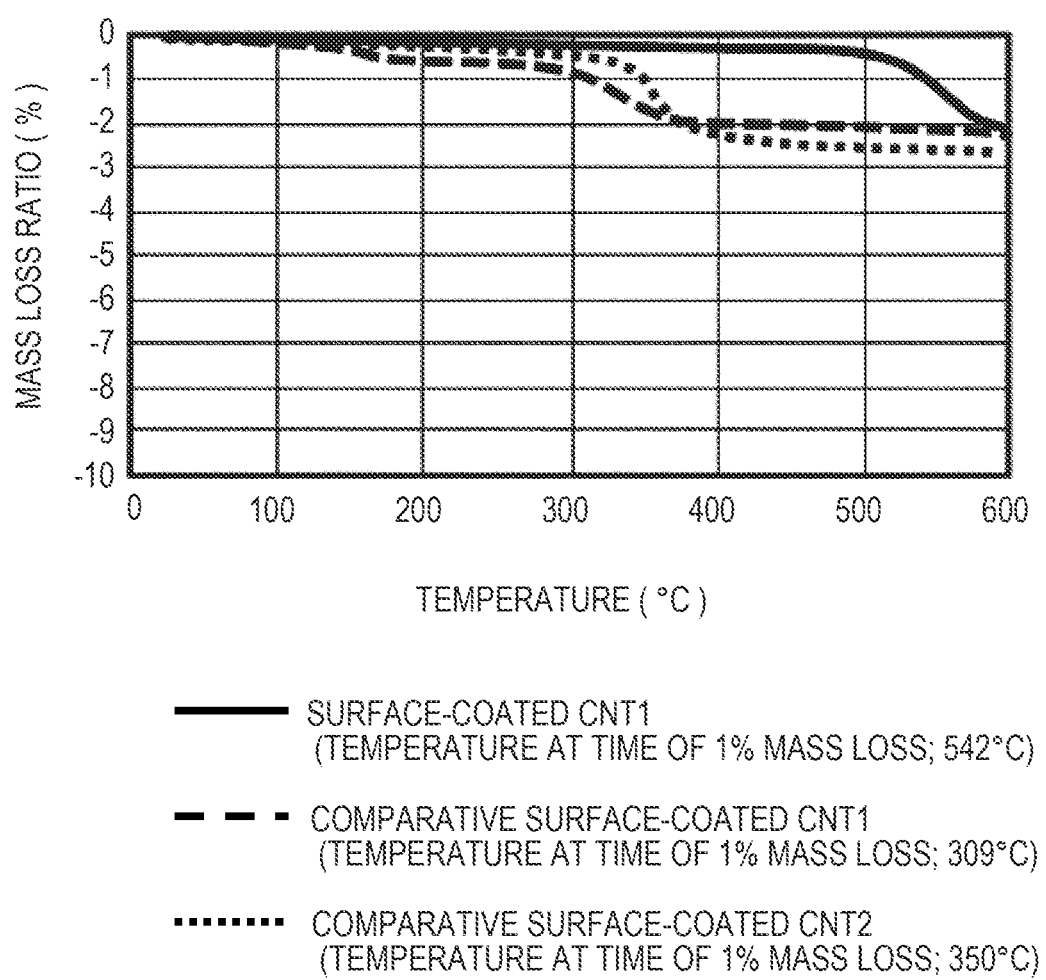
FIG. 8 is a graph for showing the results of thermogravimetry.

Next, the sediment was heated on a hot plate at 200° C. for 1 hour so that NMP was completely removed. Thus, the surface-coated CNTs 1 were obtained. The thermogravimetry (TG) of the surface-coated CNTs 1 was performed to provide a mass loss curve (see FIG. 8). The temperature of the surface-coated CNTs 1 at the time of a 1% mass loss determined from FIG. 8 was 542° C. (see Table 3).

Example 2 to Example 8

Surface-coated CNTs 2 to surface-coated CNTs 8 were each produced in conformity with the method described in Example 1 by the combination of CNTs and a coating resin shown in Table 3. In addition, the amount of the coating resin per unit mass (1 g) of the CNTs and the temperature of the CNTs at the time of a 1% mass loss were determined in conformity with the methods described in Example 1. The obtained results are shown in Table 3.

Comparative Examples 1 and 2

Comparative surface-coated CNTs 1 and comparative surface-coated CNTs 2 were each produced in conformity with the method described in Example 1 by the combination of the CNTs shown in Table 3 and the comparative resin 1 or the comparative resin 2.

In addition, the amount of the coating resin per unit mass (1 g) of the CNTs was determined for each of the comparative surface-coated CNTs 1 and the comparative surface-coated CNTs 2 in conformity with the method described in Example 1. Further, the thermogravimetry (TG) of each of the comparative surface-coated CNTs 1 and the comparative surface-coated CNTs 2 was performed to provide a mass loss curve (see FIG. 8). The temperatures of the comparative surface-coated CNTs at the time of a 1% mass loss were determined from FIG. 8. The obtained results are shown in Table 3.

TABLE 3

| Example/Comparative Example | Resin-adhered CNTs | CNTs | Resin to be caused to adhere to surfaces of CNTs | Coating amount (g/g-CNT) | Temperature at time of 1% mass loss (° C.) |
|---|---|---|---|---|---|
| Example 1 | Surface-coated CNTs 1 | CNTs 1 | Coating resin 1 | 0.082 | 542 |
| Example 2 | Surface-coated CNTs 2 | CNTs 1 | Coating resin 1 | 0.018 | 544 |
| Example 3 | Surface-coated CNTs 3 | CNTs 1 | Coating resin 1 | 0.273 | 540 |
| Example 4 | Surface-coated CNTs 4 | CNTs 2 | Coating resin 1 | 0.081 | 542 |
| Example 5 | Surface-coated CNTs 5 | CNTs 3 | Coating resin 1 | 0.079 | 538 |
| Example 6 | Surface-coated CNTs 6 | CNTs 4 | Coating resin 1 | 0.080 | 530 |
| Example 7 | Surface-coated CNTs 7 | CNTs 1 | Coating resin 2 | 0.083 | 534 |
| Example 8 | Surface-coated CNTs 8 | CNTs 1 | Coating resin 3 | 0.077 | 527 |
| Comparative Example 1 | Comparative surface-coated CNTs 1 | CNTs 1 | Comparative resin 1 | 0.084 | 309 |
| Comparative Example 2 | Comparative surface-coated CNTs 2 | CNTs 1 | Comparative resin 2 | 0.081 | 349 |

The coating amount in the surface-coated CNTs 1 in Table 3, that is, 0.082 g/g-CNT is the amount of the coating resin 1 at the time point when the adsorption of the first layer was generally completed. In addition, a case in which the amount of the coating resin 1 adsorbing to the surfaces of the CNTs is smaller than that in the surface-coated CNTs 1 is the surface-coated CNTs 2, and a case in which the amount is larger than that in the surface-coated CNTs 1 (case of multilayer adsorption) is the surface-coated CNTs 3. In each case, the temperature at the time of a 1% mass loss was a temperature higher than 350° C. Meanwhile, in each of the comparative surface-coated CNTs 1 and the comparative surface-coated CNTs 2, the temperature at the time of a 1% mass loss was lower than 350° C.

Varnishes were prepared through use of the CNTs having the resins caused to adhere to their surfaces, which had been obtained in Examples and Comparative Examples described above, by combinations shown in Table 4. Preparation methods are described below.

Example 9

(Production of Varnish 1)

A method of obtaining a varnish 1 through use of the sediment containing the surface-coated CNTs 1 obtained in Example 1 is described below.

7.5 Grams of the PAA 1 (solid content concentration: 18 mass %) and 1.24 g of the sediment containing the surface-coated CNTs 1 (solid content concentration: 25 mass %) were loaded into a vessel. Next, the contents in the vessel were kneaded with a rotation-revolution kneader (product name: RENTARO, manufactured by Thinky Corporation) for 15 minutes, and the kneaded product was deaerated for 15 minutes to provide the varnish 1.

Example 10 to Example 17

Varnishes 2 to 9 were each prepared in the same manner as in the method described in Example 9 except that the combination of the PAA and the surface-coated CNTs was set as shown in Table 4.

Comparative Example 3 and Comparative Example 4

A comparative varnish 1 and a comparative varnish 2 were each prepared in the same manner as in the method described in Example 9 except that the combination of the PAA and the comparative surface-coated CNTs was set as shown in Table 4.

Comparative Example 5

A comparative varnish 3 was prepared in the same manner as in Example 9 except that the CNTs 1 that were not coated with any resin were used.

TABLE 4

| Example/Comparative Example | Varnish | CNTs | PAA |
| --- | --- | --- | --- |
| Example 9 | Varnish 1 | Surface-coated CNTs 1 | PAA 1 |
| Example 10 | Varnish 2 | Surface-coated CNTs 1 | PAA 2 |
| Example 11 | Varnish 3 | Surface-coated CNTs 1 | PAA 3 |
| Example 12 | Varnish 4 | Surface-coated CNTs 2 | PAA 1 |
| Example 13 | Varnish 5 | Surface-coated CNTs 4 | PAA 1 |
| Example 14 | Varnish 6 | Surface-coated CNTs 5 | PAA 1 |
| Example 15 | Varnish 7 | Surface-coated CNTs 6 | PAA 1 |
| Example 16 | Varnish 8 | Surface-coated CNTs 7 | PAA 1 |

TABLE 4-continued

| Example/Comparative Example | Varnish | CNTs | PAA |
| --- | --- | --- | --- |
| Example 17 | Varnish 9 | Surface-coated CNTs 8 | PAA 1 |
| Comparative Example 3 | Comparative varnish 1 | Comparative surface-coated CNTs 1 | PAA 1 |
| Comparative Example 4 | Comparative varnish 2 | Comparative surface-coated CNTs 2 | PAA 1 |
| Comparative Example 5 | Comparative varnish 3 | CNTs 1 | PAA 2 |

Polyimide films were produced by the following methods through use of the varnishes obtained in Examples described above.

Example 18

A method of obtaining a polyimide film 1 through use of the surface-coated CNT-blended varnish 1 obtained in Example 1 is described below. When the amount of the varnish 1 was increased, the number of batches was increased or the scale of a vessel containing the varnish was increased without any change in formulation.

1 Kilogram of the PAA 1 (U-VARNISH S301, solid content concentration: 18 mass %) and 180 g of the varnish 1 (solid content concentration: 25 mass %) were loaded into a stirring vessel, and were dispersed with a planetary mixer for 60 minutes to provide a varnish 1 for film formation. The blending ratio was calculated so that the blending amount of the surface-coated CNTs became 13.2 vol % with respect to the solid content of the PAA 1, that is, the polyamic acid.

The resultant varnish 1 for film formation was applied to the surface of a cylindrical aluminum-made core body having an outer diameter of 30 mm and a length of 500 mm by using a ring coating method. The surface of the cylindrical core body was subjected to ceramic coating in advance so that a belt was easily removed from the core body after its molding.

As a drying step, while the core body was rotated at 60 rpm, its surface was heated with a near-infrared heater for 30 minutes with the temperature of the surface kept at 120° C. Further, the surface was heated at 150° C. for 20 minutes and at 200° C. for 30 minutes so that NMP was volatilized in a substantially complete manner. Thus, the coating film was solidified.

Subsequently, as an imidizing step, the core body was left at rest in a hot air-circulating furnace, and was heated at 250° C. for 30 minutes and at 350° C. for 30 minutes so that the imidization of the polyamic acid was advanced. Thus, a polyimide coating was formed. After having been cooled to about room temperature, the coating was removed from the core body to provide the polyimide film 1 having an endless shape having a thickness of 85 μm.

Example 19 to Examples 27 and Comparative Example 6 to Comparative Example 10

A polyimide film 2 to a polyimide film 10 and a comparative polyimide film 1 to a comparative polyimide film 5 were each obtained in conformity with the method described in Example 18 except that the baking condition and the kind of the varnish to be used were changed as shown in Table 5. The thicknesses of the polyimide film 2 to the polyimide film 10 and the comparative polyimide film 1 to the comparative polyimide film 5 thus obtained are shown in Table 5.

TABLE 5

| Example/Comparative Example | Polyimide film | Varnish | Baking temperature (° C.) | Blending amount of CNTs (mass %) | Thickness (μm) |
|---|---|---|---|---|---|
| Example 18 | Polyimide film 1 | Varnish 1 | 350 | 13 | 85 |
| Example 19 | Polyimide film 2 | Varnish 1 | 375 | 13 | 150 |
| Example 20 | Polyimide film 3 | Varnish 1 | 400 | 13 | 40 |
| Example 21 | Polyimide film 4 | Varnish 2 | 350 | 13 | 82 |
| Example 22 | Polyimide film 5 | Varnish 3 | 350 | 13 | 81 |
| Example 23 | Polyimide film 6 | Varnish 4 | 350 | 13 | 84 |
| Example 24 | Polyimide film 7 | Varnish 8 | 350 | 13 | 80 |
| Example 25 | Polyimide film 8 | Varnish 9 | 350 | 13 | 79 |
| Example 26 | Polyimide film 9 | Varnish 6 | 350 | 13 | 78 |
| Example 27 | Polyimide film 10 | Varnish 7 | 350 | 13 | 83 |
| Comparative Example 6 | Comparative polyimide film 1 | Comparative varnish 1 | 350 | 13 | 75 |
| Comparative Example 7 | Comparative polyimide film 2 | Comparative varnish 1 | 400 | 13 | 76 |
| Comparative Example 8 | Comparative polyimide film 3 | Comparative varnish 2 | 350 | 13 | 82 |
| Comparative Example 9 | Comparative polyimide film 4 | Comparative varnish 2 | 400 | 13 | 81 |
| Comparative Example 10 | Comparative polyimide film 5 | Comparative varnish 3 | 350 | 13 | 82 |

<Evaluation of Polyimide Film>
(Recognition of Imidization and Presence of Coating Resin)

The infrared absorption spectrum of a sample piece cut out of each of the polyimide films produced in the foregoing was measured.

As a result, in each of the polyimide films, absorption produced by an imidization reaction appeared at about 1,715 $cm^{-1}$, and hence it was recognized that the polyamic acid was converted into polyimide.

In addition, in each of the polyimide films 1 to 8, and the comparative polyimide films 5 and 6, absorption resulting from a S—C bond appeared at about 1,480 $cm^{-1}$, and hence it was recognized that the coating resin was incorporated. Meanwhile, in each of the comparative polyimide films 1 to 4 and 7, no absorption resulting from a S—C bond appeared at about 1,480 $cm^{-1}$.

(Imidization Ratio)

Imidization ratios in the respective polyimide films produced in the foregoing were determined by the method described above. The obtained results are shown in Table 6.

(Tensile Strength)

The tensile strengths of each of the polyimide films produced in the foregoing in its peripheral direction and the direction perpendicular to the peripheral direction were measured.

The tensile strengths were measured based on Japanese Industrial Standard (JIS) K 7161:2014 with a precision universal tester (product name: AUTOGRAPH AG-X, manufactured by Shimadzu Corporation) at a tensile rate of 5 mm/min, a chuck-to-chuck distance of 40 mm, and 23° C. The obtained results are shown in Table 6.

In each of the polyimide films, the same value was obtained for the tensile strength in the peripheral direction and the tensile strength in the direction perpendicular to the peripheral direction. Accordingly, the tensile strengths are collectively shown as one item "Tensile strength" in Table 6.

(Thermal Conductivity)

The thermal diffusivity of each of the polyimide films produced in the foregoing at 25° C. was measured with a periodic heating method (temperature wave analysis method)-thermal diffusivity-measuring device (product name: FTC-1, manufactured by Advance Riko, Inc.). The thermal conductivity (thickness direction) thereof was calculated by multiplying the resultant thermal diffusivity, and the density and specific heat thereof that had been separately measured.

The obtained results are shown in Table 6.

(Comprehensive Evaluation)

Each of the polyimide films produced in the foregoing was subjected to a comprehensive evaluation by the following criteria based on the evaluation results of its imidization ratio, tensile strength, and thermal conductivity.

Specifically, a polyimide film having a high thermal conductivity of 0.4 W/m·K or more and having a tensile strength in each of the peripheral direction and the direction perpendicular to the peripheral direction of 200 MPa or more, is ranked as "A". Among those, the polyimide film whose thermal conductivity in the thickness direction was 0.7 W/m·K or more is ranked as "A+". On the other hand, a polyimide film whose tensile strength in each of the peripheral direction and the direction perpendicular to the peripheral direction was less than 200 MPa even if the thermal conductivity in its thickness direction was 0.4 W/m·K or more, is ranked as "B". The results are shown in Table 6.

TABLE 6

| Example/Comparative Example | Polyimide film | Imidization ratio (%) | Tensile strength (MPa) | Thermal conductivity (W/m · K) | Comprehensive evaluation |
|---|---|---|---|---|---|
| Example 18 | Polyimide film 1 | 85 | 230 | 0.81 | A+ |
| Example 19 | Polyimide film 2 | 87 | 234 | 0.83 | A+ |
| Example 20 | Polyimide film 3 | 90 | 242 | 0.82 | A+ |
| Example 21 | Polyimide film 4 | 85 | 225 | 0.80 | A+ |
| Example 22 | Polyimide film 5 | 82 | 211 | 0.84 | A+ |
| Example 23 | Polyimide film 6 | 80 | 232 | 0.78 | A+ |
| Example 24 | Polyimide film 7 | 82 | 212 | 0.80 | A+ |
| Example 25 | Polyimide film 8 | 81 | 206 | 0.79 | A+ |
| Example 26 | Polyimide film 9 | 86 | 245 | 0.42 | A |
| Example 27 | Polyimide film 10 | 85 | 256 | 0.41 | A |
| Comparative Example 6 | Comparative polyimide film 1 | 81 | 176 | 0.66 | B |
| Comparative Example 7 | Comparative polyimide film 2 | 71 | 161 | 0.59 | B |
| Comparative Example 8 | Comparative polyimide film 3 | 80 | 158 | 0.45 | B |
| Comparative Example 9 | Comparative polyimide film 4 | 69 | 135 | 0.45 | B |
| Comparative Example 10 | Comparative polyimide film 5 | 80 | 198 | 0.69 | B |

As shown in Tables 5 and 6, the polyimide films produced at a baking temperature of 350° C. or more each had an imidization ratio of more than 80%.

However, the comparative polyimide film 5 containing the CNTs 1 whose surfaces had no resin caused to adhere thereto had a tensile strength of 198 MPa and a thermal conductivity of 0.69 W/m·K. The reason why the tensile strength was low even though its imidization ratio was 80%, is considered that the CNTs in the polyimide film formed an aggregation. Meanwhile, the polyimide films 1 to 10 each containing the surface-coated CNTs were each improved in tensile strength as compared to the comparative polyimide film 5, and hence the effect of surface coating was recognized. That is, in the polyimide film 1 to 10, the surfaces of the CNTs in the films were coated with the coating resin, thereby a repulsive force between the CNTs was produced to exhibit an aggregation-suppressing effect. In other words, it may be demonstrated that the adsorption of the coating resin to the surfaces of the CNTs is so strong as to be maintained even in the varnish or during baking.

Meanwhile, the comparative polyimide films 1 to 3 each produced by using the varnish containing the CNTs whose surfaces had been treated with the PVP or the polyoxyethylene sorbitan monolaurate at a baking temperature of 350° C. or more were each inferior in both of the tensile strength and the thermal conductivity to the comparative polyimide film 5. This is probably due to the fact that the surface-coated states of the CNTs were not maintained in the polyimide film production process by any one of the following two reasons, and hence the CNTs aggregated:

reason 1: the resin or the surfactant was replaced with the polyamic acid in the varnish, and hence desorbed from the surfaces of the CNTs; and reason 2: the resin or the surfactant was decomposed or gasified by the high baking temperature to desorb therefrom.

A fixing belt was produced by: forming an elastic layer formed of a silicone rubber on the outer peripheral surface of any one of the polyimide films according to Examples 18 to 27; and further forming a surface layer formed of a fluorine resin on the outer peripheral surface of the layer. A test was performed by using the fixing belt in a fixing device having a configuration illustrated in FIG. 2. As a result, a satisfactory energy-saving property and a fixed image were obtained, and the device functioned without any problem even after 600,000 sheets of paper had been passed.

Meanwhile, when a fixing belt similarly produced by using any one of the polyimide films according to Comparative Examples 6 to 10 was used, a crack occurred in the polyimide film owing to bending fatigue before the number of sheets of paper that had been passed reached 600,000.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099786, filed Jun. 15, 2021, and Japanese Patent Application No. 2022-081087, filed May 17, 2022, which are hereby incorporated by reference herein in their entirety.

What is claimed is:

1. A method of producing an electrophotographic belt comprising a base layer, the base layer including a polyimide film containing polyimide serving as a binder resin and a carbon nanotube, the method comprising:
   (i) causing at least one resin selected from the group consisting of: polyphenylsulfone; polysulfone; and polyethersulfone to adhere to at least a part of a surface of the carbon nanotube;
   (ii) dispersing the carbon nanotube having the resin caused to adhere to at least part of the surface thereof obtained in the step (i) in a solution containing a polyimide precursor to provide a dispersion liquid;
   (iii) forming a coating film of the dispersion liquid; and
   (iv) heating the coating film to imidize the polyimide precursor, to thereby form the base layer.

2. The method according to claim 1, wherein the polyimide has an imidization ratio of 80% or more, wherein the carbon nanotube has the at least one resin present on at least the part of the surface thereof, and wherein the base layer has a tensile strength of 200 MPa or more in each of a peripheral direction thereof and a direction perpendicular to the peripheral direction.

3. The method according to claim 2, wherein the base layer has a thermal conductivity of 0.7 W/m·K or more in a thickness direction thereof.

4. The method according to claim 1, wherein a Raman spectrum of carbon nanotubes has a G/D ratio of 10 or more.

5. A varnish comprising:
   a polyimide precursor;
   a carbon nanotube; and
   a solvent,
   wherein the carbon nanotube has at least one resin selected from the group consisting of: polyphenylsulfone; polysulfone; and polyethersulfone present on at least a part of a surface thereof.

6. The varnish according to claim 5, wherein a Raman spectrum of carbon nanotubes has a G/D ratio of 10 or more.

* * * * *